United States Patent
Bakopoulos et al.

(10) Patent No.: US 11,990,935 B2
(45) Date of Patent: May 21, 2024

(54) DEVICES, SYSTEMS, AND METHODS FOR FREE SPACE KEY EXCHANGE

(71) Applicant: MELLANOX TECHNOLOGIES, LTD., Yokneam (IL)

(72) Inventors: Paraskevas Bakopoulos, Ilion (GR); Elad Mentovich, Tel Aviv (IL); Tali Septon, Haifa (IL); Dimitrios Syrivelis, Volos (GR); Ioannis (Giannis) Patronas, Athens (GR); Dimitrios Kalavrouziotis, Papagou (GR); Moshe Oron, Rehovot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/568,441

(22) Filed: Jan. 4, 2022

(65) Prior Publication Data
US 2023/0208517 A1    Jun. 29, 2023

(30) Foreign Application Priority Data
Dec. 28, 2021   (GR) .............. 20210100915

(51) Int. Cl.
*H04B 10/11* (2013.01)
*H04B 10/70* (2013.01)

(52) U.S. Cl.
CPC .............. *H04B 10/11* (2013.01); *H04B 10/70* (2013.01)

(58) Field of Classification Search
CPC . H04B 10/11; H04B 10/1123; H04B 10/1143; H04B 10/70
USPC .......................................... 398/118
See application file for complete search history.

(56) References Cited

U.S. PATENT DOCUMENTS

| | | | | |
|---|---|---|---|---|
| 7,437,077 B2* | 10/2008 | Wirth | ............. | G02B 26/06 398/131 |
| 10,168,501 B2* | 1/2019 | Ashrafi | ............. | G02B 6/4246 |
| 11,616,572 B2* | 3/2023 | Steinlechner | ............. | H04B 10/70 398/129 |
| 2012/0008944 A1* | 1/2012 | Singla | ............. | H04J 14/0212 398/45 |
| 2012/0008945 A1* | 1/2012 | Singla | ............. | H04J 14/0204 398/45 |
| 2012/0155885 A1* | 6/2012 | Hannah | ............. | H04B 10/1143 398/128 |
| 2016/0173199 A1* | 6/2016 | Gupta | ............. | H04L 41/0803 398/127 |
| 2017/0343750 A1* | 11/2017 | Ashrafi | ............. | H04J 14/04 |
| 2018/0269972 A1* | 9/2018 | Djordjevic | ............. | H04B 10/25752 |
| 2018/0294877 A1* | 10/2018 | Gupta | ............. | H04B 10/11 |

(Continued)

FOREIGN PATENT DOCUMENTS

| | | | | |
|---|---|---|---|---|
| GB | 2599066 A | * | 3/2022 | ......... G06Q 20/0655 |
| WO | WO-2009111104 A2 | * | 9/2009 | ............. G05B 19/19 |

(Continued)

*Primary Examiner* — Abbas H Alagheband
(74) *Attorney, Agent, or Firm* — Sheridan Ross P.C.

(57) ABSTRACT

An apparatus comprises a support structure and one or more first optical components on the support structure that communicatively couple with a first endpoint. The one or more first optical components are configured to output and receive optical signals that travel over a free space medium to establish a secure link between the first endpoint and a second endpoint.

18 Claims, 6 Drawing Sheets

(56) References Cited

U.S. PATENT DOCUMENTS

2019/0007137 A1* 1/2019 Djordjevic ......... H04B 10/5161
2022/0291851 A1* 9/2022 Tylik .................... G06F 3/0659

FOREIGN PATENT DOCUMENTS

WO     WO-2021168485 A1 * 8/2021
WO     WO-2022018433 A1 * 1/2022 ......... G06Q 20/0655

* cited by examiner

DEVICES, SYSTEMS, AND METHODS FOR FREE SPACE KEY EXCHANGE

FIELD OF THE DISCLOSURE

The present disclosure is generally directed to systems, devices, and methods for free space key exchange.

BACKGROUND

Modern datacenters employ various devices and methods for high-speed data exchange that are vulnerable to malicious attacks, particularly when the data being exchanged is unencrypted.

BRIEF SUMMARY

In an illustrative embodiment, an apparatus comprises a support structure and one or more first optical components on the support structure that communicatively couple with a first endpoint. The one or more first optical components are configured to output and receive optical signals that travel over a free space medium to establish a secure link between the first endpoint and a second endpoint.

In another illustrative embodiment, a system comprises a first support structure and one or more first optical components on the first support structure that communicatively couple with a first endpoint. The one or more first optical components are configured to output and receive optical signals that travel over a free space medium to establish a secure link between the first endpoint and a second endpoint. The system further comprises a second support structure and one or more second optical components on the second support structure that communicatively couple with the second endpoint. The one or more second optical components are configured to output and receive the optical signals that travel over the free space medium to establish the secure link between the first endpoint and the second endpoint.

In yet another illustrative embodiment, a method comprises receiving a request to establish a secure link between a first endpoint and a second endpoint, determining, in response to the request, a pose of one or more first optical components associated with the first endpoint based on a known position of one or more second optical components associated with the second endpoint, and generating a control signal that causes movement of the one or more first optical components to the determined pose to establish at least part of a path for optical signals to travel over a free space medium to the one or more second optical components associated with the second endpoint.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to QKD devices and systems implementing the same.

Data security and privacy are among the top concerns in the datacenter environment. The financial cost of a security breach can be substantial, especially when customer data is exposed. Sensitive data has historically been protected by Internet Protocol (IP) segmentation and firewalls with intrusion prevention systems that were simple and faster than encryption. However, as workloads in the corporate data enter begin to migrate to the public cloud, the need to encrypt any data traversing the network becomes foundational. Hyperscale cloud service providers are increasingly enabling encryption across their massive Data Center Interconnect (DCI) networks to meet customer expectations.

To eliminate vulnerabilities in the public cloud infrastructure all segments of the cloud datacenter network need to be fortified with encryption, including the intra-datacenter segment which poses additional challenges due to the large number of connections and smaller margins.

Overall, the security of an encryption system is limited by its weakest link. In existing systems, the known weakest link is identified as the key exchange protocol like Diffie-Hellman and Rivest-Shamir-Adleman (RSA). These systems rely on the computational complexity of the associated algorithms; it is in principle possible to hack the system provided that extremely strong processing power is available. Current systems are designed in such a way that breaking the key exchange algorithm would take unrealistic time even if the state-of-the-art processing systems are used, thus making the encryption practically unhackable. However, the advent of quantum computers is expected to disrupt this methodology since the available processing power will scale exponentially.

A quantum computer capable of implementing Shor's algorithm could factor large integers exponentially faster than a classical computer, rendering common asymmetric public key encryption protocols such as RSA ineffective. Such a quantum computer can crack public encryption protocols much faster than a classical computer, rendering them unsecure. New "quantum secure" key exchange solutions are required, and ongoing research is investigating software and hardware approaches. On the software side, Post Quantum Cryptography (PQC) is focusing on algorithms that are quantum-resistant (e.g., encryption methods based on math that a quantum computer is not advantaged in computing). On the hardware side, QKD facilitates key exchange by exchanging photons which, by the principles of quantum physics, will be perturbed in a detectable way if an eavesdropper is present. Consensus is that for highest security a hybrid approach should be pursued, combining PQC with QKD.

A pervasive and future-proof solution for intra-datacenter security combining PQC and QKD faces several challenges, primarily related to the hardware nature and current implementation particularities of QKD.

QKD equipment is commercially available and is finding application in use cases where particular point-to-point links need to be secured, such as in inter- and/or intra-datacenter connections. The hardware essence of QKD requires changes to the overall network design and infrastructure. Typically, QKD equipment is added alongside existing network equipment to facilitate key exchange in select connections which are considered non-trusted. For example, in the DCI use case, each individual datacenter network is considered a trusted zone and only the connections between datacenters are enhanced by QKD. Hence, only the DCI-facing ports of the relevant network infrastructure are combined with the QKD equipment and are encrypted using QKD keys. Current QKD equipment is considerably bulky (e.g., a rack mountable form factor with several rack units of height); however, as only a few units are needed, integration is feasible without significant implications to the data center operator. However, when migrating to an intra-datacenter installation following the zero-trust concept where all links have to be secured, the number of QKD connections rises dramatically. The current form factor of QKD equipment inhibits realistic deployment inside the datacenter as it would consume the majority of each rack's volume and would degrade computational density. It is expected that new technologies (such as photonic integrated circuits) will enable the future miniaturization of QKD equipment.

Inventive concepts relate to a Free Space Optics (FSO) deployment and protocol for materializing secure key exchange between datacenter nodes that are co-located, for example, in the same room. In one embodiment, the FSO channels are operated in accordance with QKD quantum and service channel protocols and support QKD functionality. An FSO approach allows for the implementation of point-to-point QKD and service channel links. Given that QKD should be a physically separate network, materializing all possible permutations between all nodes would require a large number of optical switching layers (that has its own limitations in terms of insertion loss). With an FSO deployment according to inventive concepts, however, fiber cabling and switching layers are not required.

Public key exchange is the weakest link of the security chain. All relevant algorithms are considered broken in the post quantum era, and even with classical computing there have been many successful attacks that manage to steal the secret key that is subsequently used in symmetrically encrypted tunnels. QKD can solve the key exchange vulnerabilities once and for all because instead of relying on math, it relies on quantum properties to transmit secret keys securely. In other words, it is physically impossible to tamper a QKD channel. On the downside, QKD requires the establishment of the so-called quantum channel between the two end-points that need to exchange the key. Given that QKD channel is operating in a very volatile quantum mode, it is not feasible to leverage or even implement forwarding schemes that are similar to classical channels. The QKD channel should be a plain circuit channel that connects two end-points. Given the QKD value and promise to solve the secret key exchange once and for all, the focus is on how to materialize QKD links at scale. Example embodiments relate to an FSO approach that allows the scale of QKD links to the point that it can be used within a datacenter room deployment.

Inventive concepts propose a solution to the problem of deploying QKD point-to-point links at scale within the datacenter. Modern datacenters run many multi-tenant workloads within the same servers which increases the attack surface. Even memory contents have been recently hijacked. Symmetric encryption is gradually becoming pervasive for intra- (memory PCI-bus) and inter- (data network) server data exchanges. Every tenant uses their own keys, which in the latest approaches are transparently handled by local root of trust (RoT) architectures and the tenant never sees the keys. QKD in such scenarios is leveraged by RoT architectures to secure secret key exchange for applications that want to use the intra-datacenter network communications (a.k.a. east-west traffic).

Public key exchange is used to implement secret key exchange between applications that need to establish secure network tunnels. These are algorithmic approaches that typically base their security on hard-to-solve math problems. Today, public key security is based on np-hard problems that are not perfectly secure and, in addition, are considered broken in the post quantum era. New algorithms need to be invented and QKD currently offers a very attractive alternative that can solve the key exchange problem.

Example embodiments propose an optical network architecture and a protocol that allows the scalable deployment of QKD quantum and service channels, which allows any node in the datacenter network to securely exchange secret keys with any other node for any purpose of symmetric encryption establishment: for data-in-motion, data-at-rest or data-in-use.

Optical network architectures according to inventive concepts interconnect QKD-enabled transceivers, which allow QKD quantum and service channels to co-exist and may further haul regular network traffic or not (the latter is beyond the invention scope). The QKD-enabled transceivers that belong to each node of a rack use optical fibers to reach the roof of the rack. The fibers are tidily railed until they reach the top of the rack. At the top of the rack, following a proper assembly of spatial light modulators (digitally controlled micro mirror devices (DMDs), Liquid Crystals in Silicon (LCoS), Micro Electro-Mechanical System (MEMS) Mirrors) or other suitable free space optics technology, the fibers are terminated and the signal exits the fiber glass wave guide and enters the free space waveguide. A similar DMD or mirror assembly may be mounted on the ceiling of the room to reflect the light beam towards the destination rack DMD assembly. This architecture allows for dynamic deployment of QKD links between any nodes following the described FSO network architecture that includes the datacenter room ceiling reflections.

At the software-level, this architecture extends the basic key retrieval that is standardized by ETSI QKD014 interface and the relevant procedures to facilitate the dynamic routing nature of the described QKD over FSO architecture. To summarize, before determining which QKD node pairs should deliver a secret key, commands that bring up the link of such a pair are issued. Such commands may result in triggering an orchestration layer to appropriately operate the DMD assemblies on top of the designated endpoints.

The aim is to form direct point-to-point links with the fixed number of 1× hops when a QKD link needs to be established between 2× racks.

The QKD transceivers use fiber cables that enable optical signals to reach the top of a rack having one or more network switches and/or servers mounted therein. Thereafter, the optical signals enter one or more optical components, such as a micro mirror device, that steers the signals towards a ceiling-attached mirror assembly that reflects the signals to the destination rack micro mirrors, and from there, to a designated photodetector that transfers the received signal on a fiber towards the destination QKD transceiver. Notably the QKD links are hauling both quantum and service channel traffic which ride different wavelengths. However, example embodiments are not limited thereto, and the service channel may be implemented in-band with a physical channel (e.g., a fiber optic cable).

The proposed QKD network architecture scales so that each rack forms a local QKD island (interconnected with a local switch) and there is an all-to-all connectivity capability between the islands using the FSO approach. At least one embodiment implements a fully connected graph between all QKD transceivers if each rack has an appropriately-sized micro mirror matrix.

The QKD014 ETSI standardizes an application program interface (API) and defines the set of interactions that two applications should implement to retrieve a secret key at each endpoint of the QKD link. The QKD014 standard assumes that QKD links are permanently fixed and already brought up, as it considers fixed fiber link setups which may form ring topologies to interconnect more than one QKD endpoint. Example embodiments take an approach where the QKD links are not fixed but constantly change to implement different permutations, so a fully connected topology may be realized. For this to happen, the micro mirrors of each rack and intra-rack switches should be configured to steer the optical signal towards the proper destinations. Therefore, the QKD014 and similar protocols are enhanced with procedures that bring up the QKD link before they proceed with the key retrieval.

One procedure call added is the LinkBringUP which uses existing identifiers of QKD014 (e.g., Master and Slave secure application entity identifiers (SAEIDs)) to identify the endpoints that should be connected. Subsequently, the protocol engine contacts the configuration plane agents of each switch and micromirror involved in the transfer to materialize the QKD link. Subsequently, the QKD transceivers are triggered to bring-up the link, and only after this point may key retrieval requests be issued following the existing standardized procedures.

Figure 1:
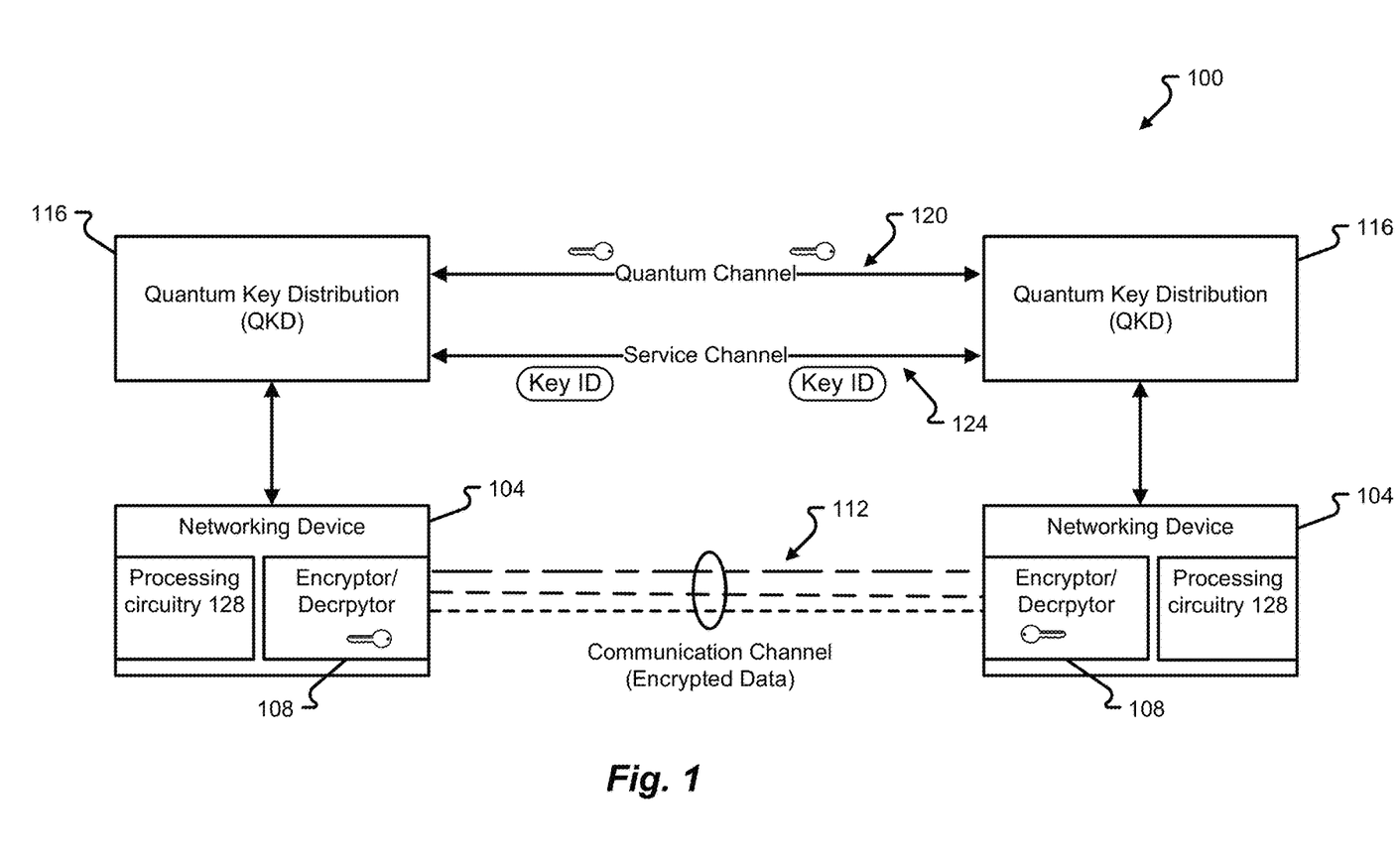
FIG. 1 illustrates a block diagram of a system according to at least one example embodiment.

FIG. 1 illustrates a possible system 100 configuration in which QKD devices 116 are deployed alongside networking devices 104. A QKD secured link or encrypted communication channel 112 connects two networking devices 104. Examples of networking devices 104 include, without limitation, edge routers, switches, Network Interface Cards, Top of Rack (ToR) switches, server blades, etc. Each networking device 104 can have encryption capabilities, via an encryptor/decryptor 108, for particular ports (typically hardware accelerated to achieve high line speeds) or, alternatively, can be connected to a dedicated device serving as an encryptor for each port. Encrypted data is exchanged through the communication channel 112 directly connecting the two networking devices 104.

The encryptor/decryptor 108 of each networking device 104 utilizes QKD keys that have been exchanged via the QKD devices 116. The encryptor/decryptor 108 may include suitable hardware and/or software for encrypting data and storing the encrypted data on encrypted memory. The encryptor/decryptor 108 may further include suitable hardware and/or software for decrypting the data from encrypted memory. The encryptor/decryptor 108 may encrypt data from one or more Central Processing Units (CPUs) using a key received from a local root of trust over an isolated (secure) channel established with the QKD device 116. The encryptor/decryptor 108 may include encrypted memory in the form of volatile and/or non-volatile storage devices. Non-limiting examples of suitable memory devices for the encrypted memory include flash memory, Random Access Memory (RAM), variants thereof, combinations thereof, or the like. The encrypted memory may be main system memory of the networking device 104, peripheral device dedicated memory (e.g., Graphics Processing Unit (GPU) memory), encrypted storage (e.g., NVMe Over Fabric), and/or storage class memory.

The QKD keys are exchanged between the QKD devices 116 through a quantum channel 120. An additional service channel 124 between the QKD devices 116 may be used to facilitate the implementation of the QKD protocol. The service channel 124 may be used by the QKD devices 116 to exchange information about key identifiers and does not carry the actual keys. Therefore, any information exchanged via the service channel 124 will not necessarily compromise the system's 100 security. As discussed in more detail below, the quantum channel 120 and/or the service channel 124 between the QKD devices may be established over a free space medium (e.g., ambient air). However, example embodiments are not limited thereto, and the service channel 124 may be implemented in-band with the communication channel 112 or as a separate physical channel.

Each networking device 104 may be connected to a QKD device 116 through a physical link. An illustrative, but non-limiting example of a physical link that may be used to couple a QKD device 116 to a networking device 104 is a 1 GbE LAN port. Communication between the QKD device 116 and the networking device 104 aims to provide the QKD keys and key IDs to the networking device 104 and is typically implemented according to existing standards such as the ETSI014 (also referred to as QKD014). In this standard, the QKD device 116 exposes an https server from whom the networking device 104 queries the key IDs. The QKD device 116 and the networking device 104 are located on the same site, which is considered a secure domain; therefore, the link between them does not introduce security vulnerabilities.

While illustrated and described as a network element, it should be appreciated that the networking device 104 may correspond to any type of device that becomes part of or is connected with a communication network. Other examples of suitable devices that may act or operate like a networking device 104 as described herein include, without limitation, one or more of a Personal Computer (PC), a laptop, a tablet, a smartphone, a server, a collection of servers, or the like.

The communication channel 112 is described as traversing a datacenter, but it should be appreciated that the communication channel 112 may traverse any type of communication network (whether trusted or untrusted). Examples of a communication network that may be used to connect networking devices 104 and support the communication channel 112 include, without limitation, an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network enables data transmission between the networking devices 104 using optical signals. In this case, the networking devices 104 and the communication network may include waveguides (e.g., optical fibers) that carry the optical signals. In one specific, but non-limiting example, the communication network enables data transmission between the networking devices 104 using electrical signals. In this case, the networking devices 104 and the communication network may include conductive wires (e.g., copper wires) that carry the electrical signals. In one embodiment, the communication network enables data transmission with both electrical and optical signals.

Each networking device 104 may further include processing circuitry 128 to control various functions of the networking device 104. The processing circuitry 128 may comprise software, hardware, or a combination thereof. For example, the processing circuitry 128 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 128 may comprise hardware, such as an application specific integrated circuit (ASIC). Other non-limiting examples of the processing circuitry 128 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 128 may be provided on a Printed Circuit Board (PCB) or collection of PCBs. It should be appreciated that any appropriate type of electrical component or collection of electrical components may be suitable for inclusion in the processing circuitry 128.

Although not explicitly shown, it should be appreciated that the networking devices 104 may include other storage devices and/or processing circuitry for carrying out computing tasks, for example, tasks associated with controlling the flow of data over the communication network 112. It should be further understood that such processing circuitry may take the form of hardware and/or software in the same or similar manner as the processing circuitry 128.

In addition, although not explicitly shown, it should be appreciated that the networking devices 104 include one or more communication interfaces for facilitating wired and/or wireless communication between one another and other unillustrated elements of the system 100.

In some embodiments, the networking device 104 may be configured to include or interact with pluggable QKD devices 116, which may be connected to a front panel of the networking device 104. In this way, the QKD device along with a quantum random number generator (QRNG) may represent a QKD system that is integrated (partially or completely) on the networking device 104.

As can be appreciated, various design considerations will be described in connection with different networking devices 104. It should be appreciated that any combination of approaches can be combined or portions of certain approaches may be used without departing from the scope of the present disclosure. For instance, a pluggable QKD device 116 may be used while a separate QRNG is externally connected to a networking device 104 (e.g., rather than being mounted directly adjacent to the location where the pluggable QKD device 116 will be inserted).

Figure 2A:
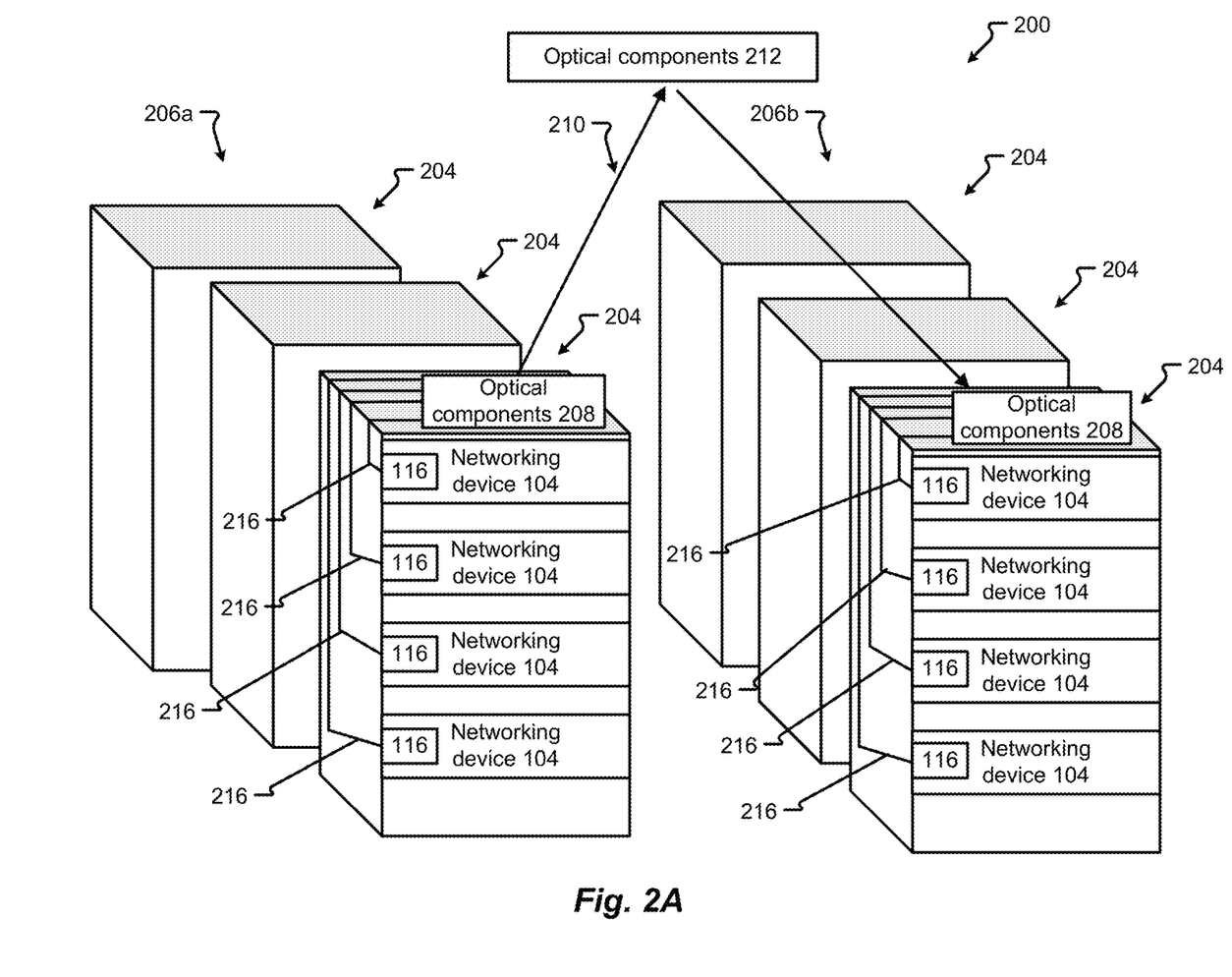
FIG. 2A illustrates a block diagram a system including components from the system of FIG. 1 according to at least one example embodiment.
Figure 2B:
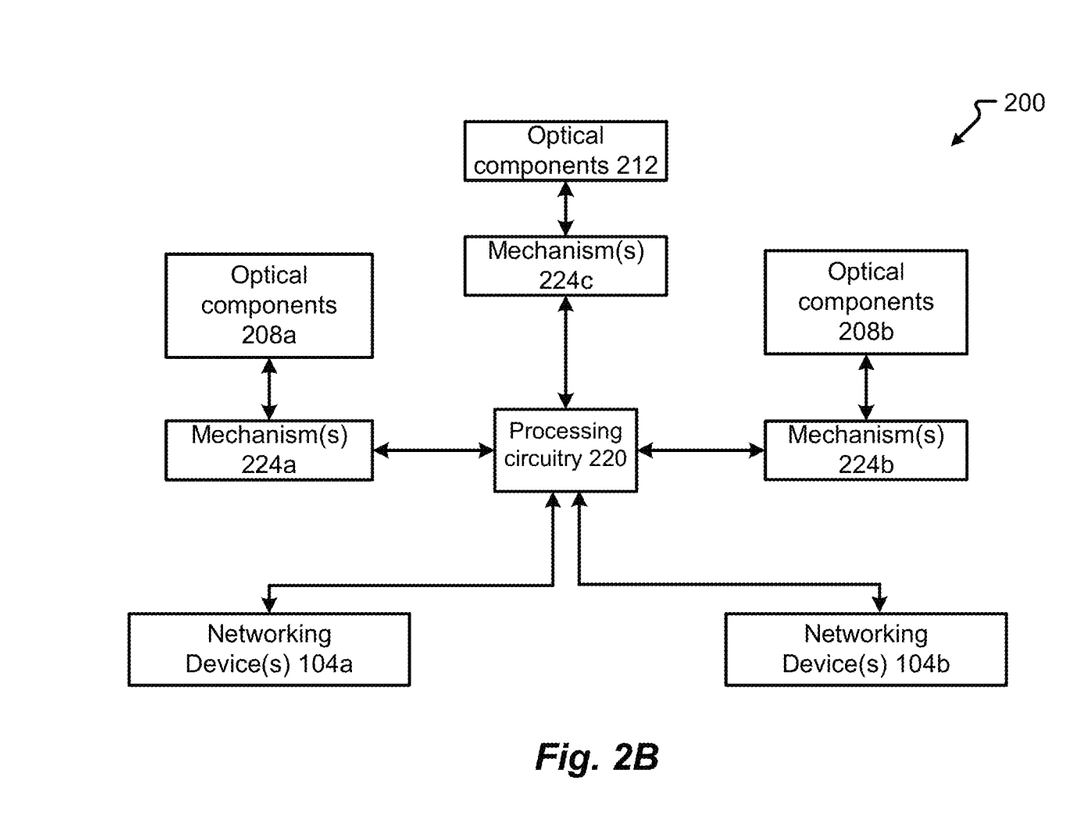
FIG. 2B illustrates additional details of the system in FIG. 2A according to at least one example embodiment.

FIG. 2A illustrates a system 200 according to at least one example embodiment. FIG. 2B illustrates additional details of the system 200 in FIG. 2A.

With reference to FIG. 2A, the system 200 includes a plurality of support structures 204, optical components 208 and 212, and waveguides 216.

The plurality of support structures 204 may correspond to networking racks arranged in rows 206a and 206b. Each rack 204 may include one or more of the networking devices 104 from FIG. 1 mounted therein, with each networking device 104 including a respective QKD device 116. The system 200 may be located within a room of a datacenter, and the networking devices 104 may correspond to servers and/or modular network switches for routing network traffic internal to and external to the datacenter. Here, it should be appreciated that a number of racks 204 and the specific design of each rack 204 (e.g., a number and type of networking devices 104) may vary according to design preferences.

In general, at least two of the racks 204 include the optical components 208 for outputting and receiving optical signal (s) 210 over a free space medium. The optical components 208 on each rack 204 may comprise a suitable number of mirrors, lenses, prisms, and/or other components for directing light arranged in a manner that is suitable for outputting and receiving optical signals to and from optical components 212. Here, it should be appreciated that support structures other than racks 204 may be used to support the optical components 208 so long as the optical components 208 are communicatively coupled to one or more networking devices 104. For example, support structures 204 may be employed as stands separate from but in proximity to the racks.

The optical components 212 direct optical signal(s) 210 received from a first set of optical components 208 on a first rack 204 toward a second set of optical components 208 on a second rack 204. Thus, the optical components 212 may comprise a suitable number of mirrors, lenses, prisms, and/or other components for directing light arranged in a manner that is suitable for outputting and receiving optical signals toward and from optical components 208 on at least two different racks 204. The optical components 212 may be at a location that is above the racks 204, for example, mounted on a ceiling of within the room of the datacenter. However, example embodiments are not limited to locating the optical components 212 above the optical components 208 and the optical components 212 may be at a location that maintains a line of sight with optical components 208 on one or more racks 204 (e.g., optical components 212 may be on a same plane as the optical components 208 or below the optical components 208). Although one set of optical components 212 is shown, multiple sets of optical components 212 may be included depending on scale of the system 200. Further still, example embodiments are described with reference to a "one-hop" scenario where optical signals encounter one point of reflection at optical components 212, but the scope of inventive concepts also covers "multi-hop" scenarios where an optical signal is reflected multiple times between two endpoints (e.g., reflected from one set of optical components 212 above a rack 204 to another set of optical components 212 on another rack 204 to yet another set of optical components 212 above the another rack 204 before reaching a destination set of optical components 208).

In at least one embodiment, the optical components 208 and/or the optical components 212 comprise optical microelectromechanical systems (MEMS) that can be controlled to direct light in a particular direction. For example, the optical components 208 on one or more racks 104 and/or optical components 212 may include a digital micromirror (DMD), an array of DMDs, and/or other suitable light directing component whose angle of tilt is mechanically controllable so that an incident optical signal is directed (e.g., reflected) in a desired direction.

Each set of optical components 208 may include designated subsets of optical components communicatively coupled with an entity of a respective networking device 104 that is responsible for establish secure links using encryption keys. The example of FIG. 2A illustrates waveguides 216 (e.g., optical fibers) that communicatively couple the subsets of optical components 208 to respective QKD devices 116. A number of waveguides 216 between the optical components 208 and a respective QKD device 116 may vary according to design preferences. For example, each QKD device 116 may be comprised an optical transceiver with an output and an input. In this case, a first waveguide 216 (e.g., receive waveguide) may couple the output of the optical transceiver with a first set of lenses and/or mirrors of the optical components 208 while a second waveguide 216 (e.g., a transmit waveguide) may couple the input of the optical transceiver with a second set of lenses and/or mirrors of the optical components 208.

In FIG. 2A, the waveguides 216 are affixed to one side of each rack 204 (e.g., at an exterior side or an interior side) in any suitable manner. However, example embodiments are not limited thereto and the waveguides 216 may be routed between the optical components 208 and a respective networking device 104 in at suitable location and in any suitable manner.

FIG. 2A illustrates an example where each networking device 104 includes a respective QKD device 116. Additionally or alternatively, two or more networking devices 104 on a same rack 204 or even a different rack 204 (e.g., networking devices 104 on different racks 204 in the same row) may share a single QKD device 116 or other encryption device for sending encryption keys over a free space medium. In this case, a switch, such as an optical or electrical switch, may be coupled between the shared QKD device 116 and the two or more networking devices 104 to enable switching between which networking device 104 uses the shared QKD device 116. Employing a shared QKD device 116 may reduce the number of optical components 208 used for outputting and receiving optical signals to and from free space. For example, if an entire rack 204 of networking devices 204 shares a single QKD device 116, then the number optical components 208 used may be limited to the number needed to communicatively couple to the single QKD device 116 instead of the number needed to communicatively couple to a QKD device 116 for each networking device 104.

It should be appreciated that each rack 204 within the room of the datacenter may include a respective set of optical components 208 communicatively coupled with networking devices 104 of that rack to enable one-to-one communication amongst the racks 204. However, example embodiments are not limited thereto and fewer sets of optical components 208 may be employed if desired. For example, as shown in FIG. 2A, one set of optical components 208 may be employed for one row 206a of racks 204 while another set of optical components 208 may be employed for another row 206b of racks 204. That is, each row 206a and 206b of racks 204 uses a single set of optical components 208 mounted on one of the racks 204 in that row. In this case, optical switches may be coupled between the single set of optical components 208 used for that row 206 and the networking devices 104 included in the racks 204 of that row 206. The optical switches may be employed in any suitable manner to enable selective coupling of the optical components 208 to a selected one(s) of the networking devices 104 in that row 206. In this way, multiple networking devices 104 on different racks 204 in a same row of racks can use the same set of optical components 208 for free space communication with networking devices 104 included in racks 204 of a different row of racks.

FIG. 2B illustrates a block diagram to convey additional details that relate to the system's 200 ability to move the optical components 208 and/or 212 in FIG. 2A with one or more mechanisms 224 under control of processing circuitry 220. In FIG. 2B, networking devices 104a, the optical components 208a, and the mechanism(s) 224a are associated with (e.g., mounted on) a first rack 204 while the networking devices 104*b*, optical components 108*b*, and mechanism(s) 224*b* are associated with (e.g., mounted) on a second rack 204. As described in more detail below, the processing circuitry 220, which may be implemented by any suitable combination of hardware and/or software elements listed above for processing circuitry 128, may be involved in the bring-up sequence of a free space optical link between a networking device 104*a* and a networking device 104*b* on different racks 204 for the purposes of establishing a secure link over a communication channel 112. For example, the processing circuitry 220 receives requests from network devices 104*a* and/or 104*b* to establish a secure link for data communication and, responsive thereto, controls the mechanisms 224*a*, 224*b*, and/or 224*c* to move a respective set of optical components 208*a*, 208*b*, and/or 212 in order to establish a desired optical path through free space from optical components 208*a* to optical components 208*b* through intervening optical components 212.

The example illustrated in FIG. 2B shows that processing circuitry 220 is a centralized processor for the system 200 that is in communication with all or nearly all components of the system 200 used to control optical components 208 and 212 (e.g., networking devices 104 and mechanisms 224). However, example embodiments are not limited thereto, and separate instances of processing circuitry 220 may be used for separate components of the system 200 (e.g., a single instance of processing circuitry 220 may be employed for each set of mechanisms 224*a* to 224*c*). Alternatively, there may be multiple instances of processing circuitry 220 with each instance being used to control a group of mechanisms 224.

In at least one embodiment, optical components 208 and/or optical components 212 are fixed in place (i.e., not movable). For example, optical components 212 may comprise statically positioned mirrors that maintain a fixed pose so that incoming optical signals 210 from a first set of optical components 208*a* are reflected to the same location which may correspond to a location of a second set of optical components 208*b*. In this case, mirrors in the first set of optical components 208*a* and/or the second set of optical components 208*a* may be mechanically controlled by processing circuitry 220 to have poses that enable a free-space optical path for optical signals 210 to travel between one another. Additionally or alternatively, the optical components 208*a* and/or 208*b* include statically positioned light directing elements (e.g., lenses and/or mirrors). Here, the optical components 212 may include movable mirrors that are moved by the mechanism(s) 224*c* to enable the system 200 to establish a free space optical path between optical components 208*a* and 208*b*.

Throughout this description, a pose of a component refers to both the position and orientation of the component. For example, the pose of a mirror in the optical components may refer to its position as a position in an xyz coordinate system (e.g., the xyz coordinate system of the system 200) and its orientation as an angle of tilt with respect to a reference angle (e.g., 0-degrees).

In at least one embodiment, the processing circuitry 220 accesses a mapping of the system 200 that includes information on how to establish a connection between two end points (e.g., between network devices 104*a* and 104*b*) using a free space optical path enabled by optical components 208*a*, 208*b*, and 212. For example, in a scenario where the optical components 208*a*, 208*b*, and 212 are implemented with mirrors and/or lenses that direct optical signals into and out of free space, such information may inform on which mirrors and/or lenses should be used to establish the desired free space optical path between endpoints. For example, if the optical components 208*a*, 208*b*, and 212 are in fixed poses and are not movable, then the mapping may inform on which stationary optical components usable to establish a free space optical path between endpoints. On the other hand, if any of the mirrors in optical components 208*a*, 208*b*, or 212 are movable, then the mapping may further provide information on the poses of the movable mirrors that should be used to establish the free space optical path. In this case, the processing circuitry 220 controls mechanisms 224 based on the mapping to move the optical components into poses that establish the free space optical path between endpoints. The above-described mapping may be created upon installation of the network devices 104 into the system 200 and updated as needed to account for changes to the system 200 (e.g., network devices 104 added and removed from the system 200).

Figure 3:
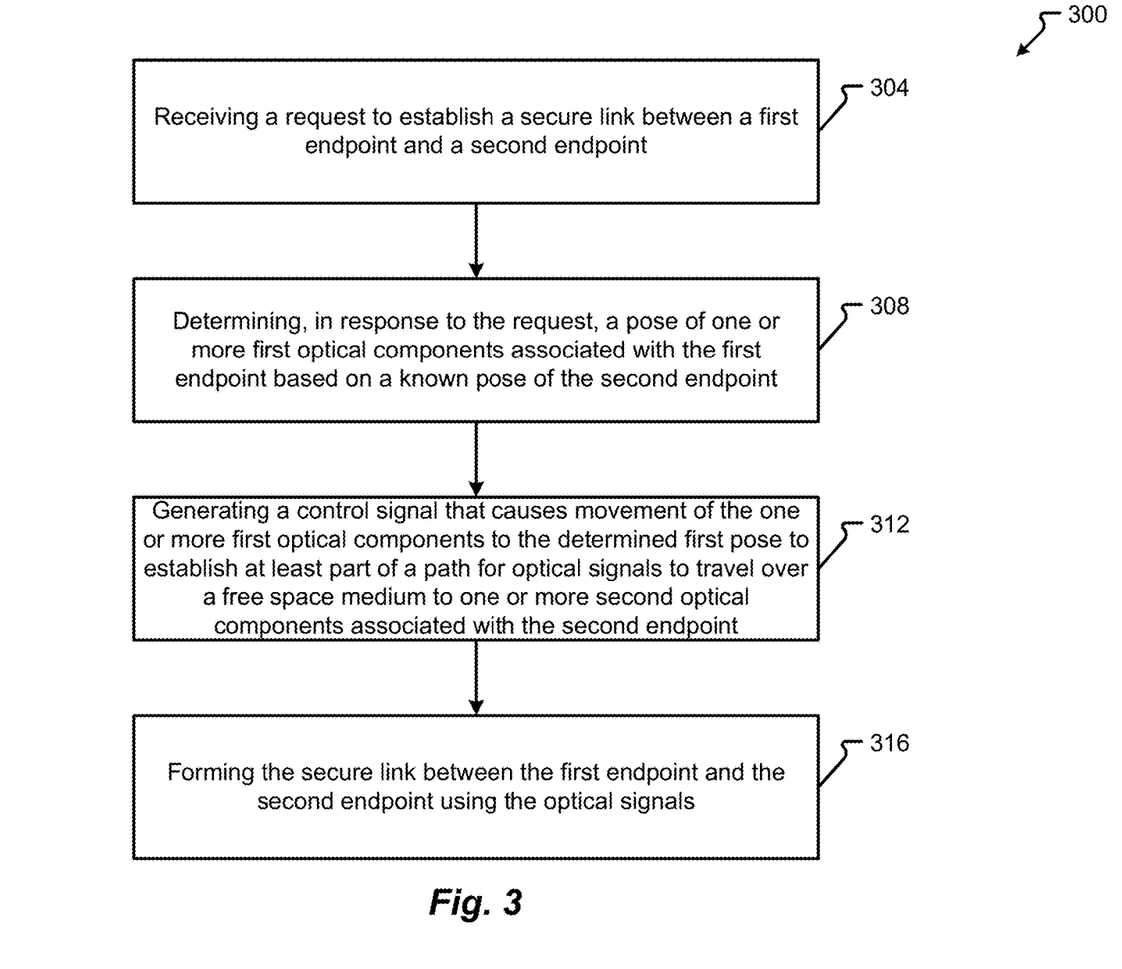
FIG. 3 illustrates a method according to at least one example embodiment.

FIG. 3 illustrates a method 300 according to at least one example embodiment.

The method 300 (and/or one or more stages thereof) may be carried out or otherwise performed by various elements of the systems 100 and/or 200, for example, by processing circuitry 128 and/or processing circuitry 220. For the sake of explanation, FIG. 3 will be described with reference to FIG. 2B.

Operation 300 includes receiving a request to establish a secure link between a first endpoint and a second endpoint. The first and endpoints may correspond to networking devices 104*a* and 104*b*, respectively. In one example, processing circuitry 220 receives the request from a networking device 104*a* that wishes to establish the secure link with another networking device 104*b*. The request may be a signal that originates from a networking device 104*a* as a result of an application running on the networking device 104*a* or on a server connected to the networking device 104*a* wishing to securely exchange data with another application running on another networking device 104*b* or server connected to networking device 104*b*. However, example embodiments are not limited thereto, and the request in operation 304 may be generated in any suitable manner.

Operation 308 includes determining, in response to the request from operation 304, a pose of one or more first optical components 208*a* associated with the first endpoint 104*a* based on a known pose of one or more second optical components 208*b* associated with the second endpoint 104*b*. For example, as noted above, the processing circuitry 220 may include or access a mapping that informs on how each set of optical components within the system are or should be positioned and oriented (i.e., pose) to establish a free space optical path between that set of optical components and a remotely located set of optical components. In this example, the one or more second optical components 208*a* may be fixed in place while the one or more first optical components 208*a* are movable into the pose determined in operation 308 to establish a free space channel for optical signals to travel between optical components 208*a* and 208*b*. As noted above and below, the optical components 212 are optional and may be positioned in the free space channel to assist with directing optical signals between optical components 208*a* and 208*b*.

Operation 312 includes generating a control signal that causes movement of the one or more first optical components 208*a* to the determined pose to establish at least part of a path for optical signals to travel over a free space medium to the one or more second optical components 208*b* associated with the second endpoint 104*b*. For example, processing circuitry 220 generates the control signal and sends the control signal to the mechanism 224a which in turn moves the optical components 208a into the determined pose.

Operation 316 includes forming the secure link between the first endpoint 104a and the second endpoint 104b using the optical signals that travel over a free space medium between optical components 208 and 208b. In at least one example embodiment, the secure link is quantum secure. For example, QKD devices 116 associated with each networking device 104a and 104b transmit and receive the optical signals that travel over the free space medium to perform key exchange operations in accordance with suitable QKD protocols (e.g., according to QKD014 standards) to establish the quantum secure link between the endpoints 104a and 104b. Such protocols may include authentication procedures to ensure that the two endpoints 104a and 104b are the intended endpoints, key exchange operations, key ID exchange operations, and other suitable operations for establishing the quantum secure link according to QKD standards.

In at least one embodiment, the free space channel established between two sets of optical components 208a and 208b is a majority free space channel or medium in that most (e.g., more than 50%) or all of the communication channel for carrying QKD signals between the sets of optical components 208a and 208b comprises free space. For example, if optical components 212 are omitted from the system or bypassed, then the optical signals that travel between optical components 208a and 208b may travel through free space exclusively. However, if optical components 212 or other intermediate components are included in the communication channel between optical components 208a and 208b, then these components are not considered as part of free space, and thus, the communication channel between optical components 208a and 208b may comprise a majority free space medium.

Example embodiments are not limited optical signals traveling between optical components 208 and 208b over a majority free space medium, and the communication channel between optical components 208a and 208b may comprise a minority (e.g., less than 50%) free space medium if, for example, optical components 212 or other intermediate components comprise waveguides that carry an optical signal received over free space from optical components 208a some distance before outputting the optical signal to free space toward optical components 208b. In this case, the distance traveled within the waveguide may cause the total communication channel between optical components 2018 and 208b to be comprised of less than 50% free space.

In any event, however, it should be appreciated that the communication channel between the optical components 212 and 208a and the communication channel between the optical components 212 and 208b are both comprised a completely free space medium.

It should be appreciated that operations 304, 308, and 312 are operations performed in addition to (and prior to) operations set forth in current QKD standards in order to set up or bring up the link between two endpoints while operation 316 relates to forming the secure link according to suitable QKD techniques.

Although not explicitly shown, the method 300 may include an additional operation between operations 312 and 316 to ensure that the communication channel between optical components 208a and 208b has been established for the proper networking devices 104a and 104b. For example, the processing circuitry 128 within networking device 104a may send a test signal over the free space medium and over a wired or fiber channel (e.g., the communication channel 112) to networking device 104a. If the test signal received by networking device 104b from networking device 104a over the free space medium matches the test signal received by the networking device 104b from networking device 104a over the wired or fiber channel, then the method determines that the optical components 208a and 208b are in proper poses and ready to establish the secure link over free space. If the test signals do not match, then the system may automatically attempt corrective action (e.g., attempt realignment of optical components 208a and/or 208b) and/or send a warning message to an operator of the datacenter. This additional operation may be performed in addition to or in place of authentication procedures included in existing QKD standards.

Figure 4:
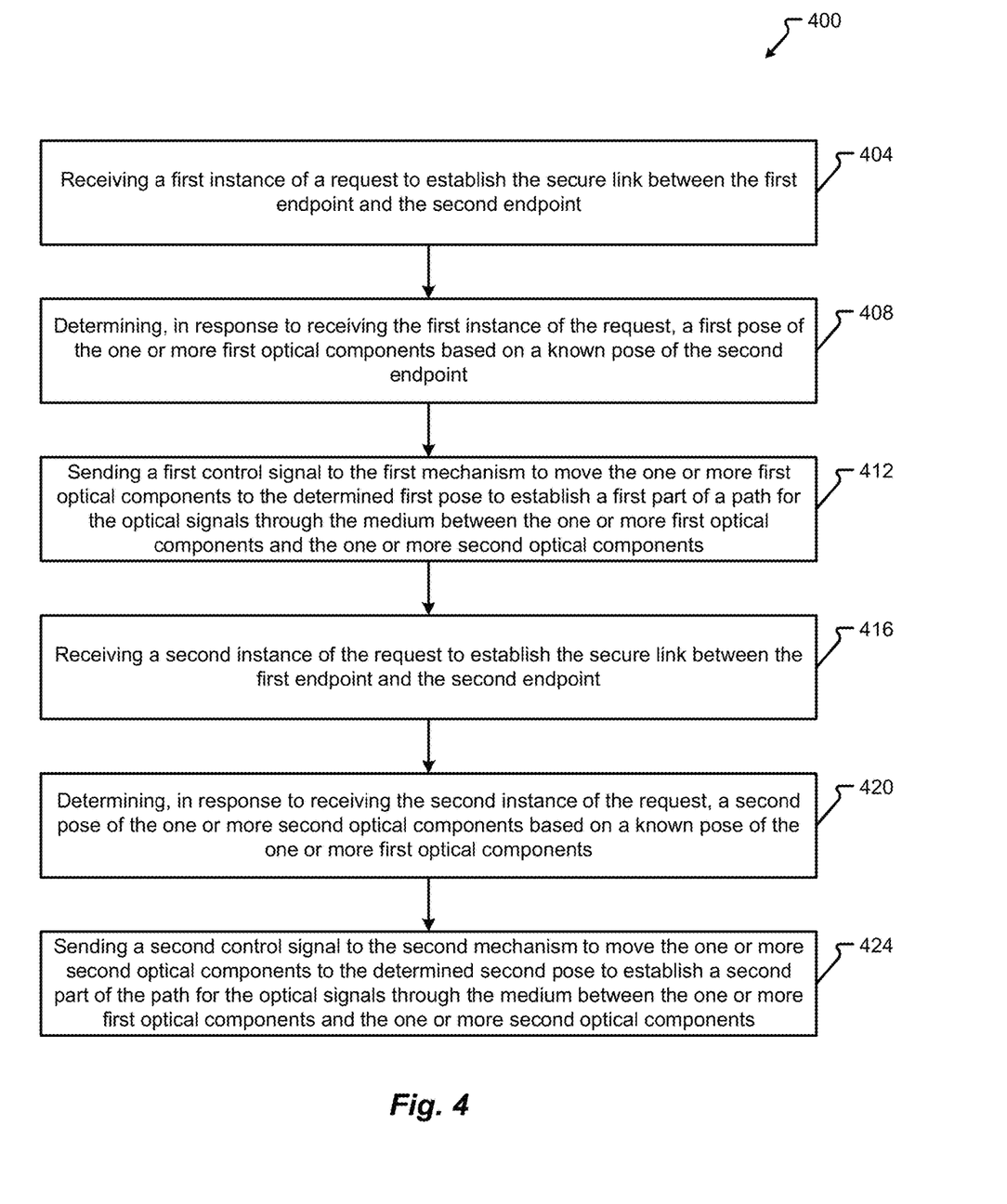
FIG. 4 illustrates a method according to at least one example embodiment.

FIG. 4 illustrates a method 400 according to at least one example embodiment.

The method 400 (and/or one or more stages thereof) may be carried out or otherwise performed by various elements of the systems 100 and/or 200, for example, by processing circuitry 128 and/or processing circuitry 220. For the sake of explanation, FIG. 4 will be described with reference to FIG. 2B. The method 400 may relate to operations carried out for the purpose of establishing a secure link between two endpoints 104a and 104b, where each endpoint is communicatively coupled to respective movable optical components 208a and 208b.

Operation 404 includes receiving a first instance of a request to establish a secure link between the first endpoint 104a and the second endpoint 104b. The first instance of the request may be received by processing circuitry 220 on behalf of endpoint 104a. The request in operation 404 may be generated and received in the same or similar manner as that described above in operation 304.

Operation 408 includes determining, in response to receiving the first instance of the request, a first pose of the one or more first optical components 208a based on a known pose of the one or more second optical components 208a. As noted above, the processing circuitry 220 may access a mapping of the optical components in the system to determine the poses. The known pose of the one or more second optical components 208b may be a known current pose of the one or more second optical components 208b as indicated by the mapping or a known future pose of the one or more second optical components 208b, for example, as determined in operation 420.

Operation 412 includes sending a first control signal to the first mechanism 224a to move the one or more first optical components 208a to the determined first pose to establish a first part of a path for the optical signals through the free space medium between the one or more first optical components 208a and the one or more second optical components 208b. For example, the processing circuitry 220 generates and sends the first control signal to mechanism 224a which in turn causes the optical components 208a to move into the first pose. The first part of the path for the optical signals may correspond to the part of the path through the free space medium between optical components 208a and optical components 212.

Operation 416 includes receiving a second instance of the request from operation 404 to establish the secure link between the first endpoint 104a and the second endpoint 104b. The second instance of the request may be received by processing circuitry 220 on behalf of endpoint 104b. The request in operation 416 may be generated and received in the same or similar manner as that described above in operations 304 and 404. As noted above in the discussion of FIG. 2B, the processing circuitry 220 may be a central controller for the system or may include separate instances for independently communicating with parts of the system. Here, it should be appreciated that the example discussed with reference to FIG. 4 assumes that the processing circuitry 220 includes separate, independent instances for each endpoint 104a and 104b. Accordingly, operations 404 and 416 describe receiving separate instances of the request, one instance of the request for each instance of the processing circuitry 220. However, in the event that one instance of the processing circuitry 220 provides central control for the system as depicted in FIG. 2B, then first instance of the request in operation 404 may also be used to trigger operation 420. In this case, operation 416 may be omitted or bypassed.

Operation 420 includes determining, in response to receiving the second instance of the request, a second pose of the one or more second optical components 208b based on a known position of the one or more first optical components 208a. As noted above, the processing circuitry 220 may access a mapping of the optical components in the system to determine the poses. The known pose of the one or more first optical components 208a may be a known current pose of the one or more first optical components 208a, for example, as determined in operation 408, or a known future pose of the one or more first optical components 208a as indicated by the mapping.

Operation 424 includes generating and sending a second control signal to the second mechanism 224b to move the one or more second optical components 208b to the determined second pose to establish a second part of the path for the optical signals through the free space medium between the one or more first optical components 208a and the one or more second optical components 208b. For example, the processing circuitry 220 sends the second control signal to mechanism 224b which in turn causes the optical components 208b to move into the second pose. The second part of the path for the optical signals may correspond to the part of the path through the free space medium between optical components 208b and optical components 212. The combination of the first part of the path for the optical signals and the second part of the path of the optical signals forms the free space channel through which the optical signals travel between first optical components 208a and the second optical components 208b via at least one reflection from the optical components 212.

FIG. 4 describes an example where the optical components 208a and 208b move in order to establish a free space communication channel between one another. However, it should also be appreciated that optical components 212 may be moved with mechanism 224c as part of the method 400.

Subsequent to operation 424, a secure link may be formed between the first endpoint 104a and the second endpoint 104b over the free space channel created between the two endpoints. The secure link may be established in the same or similar manner as described above with reference to FIG. 3. Thereafter, the first endpoint 104a and the second endpoint 104b may exchange encrypted data over the secure link through communication channel 112.

Figure 5:
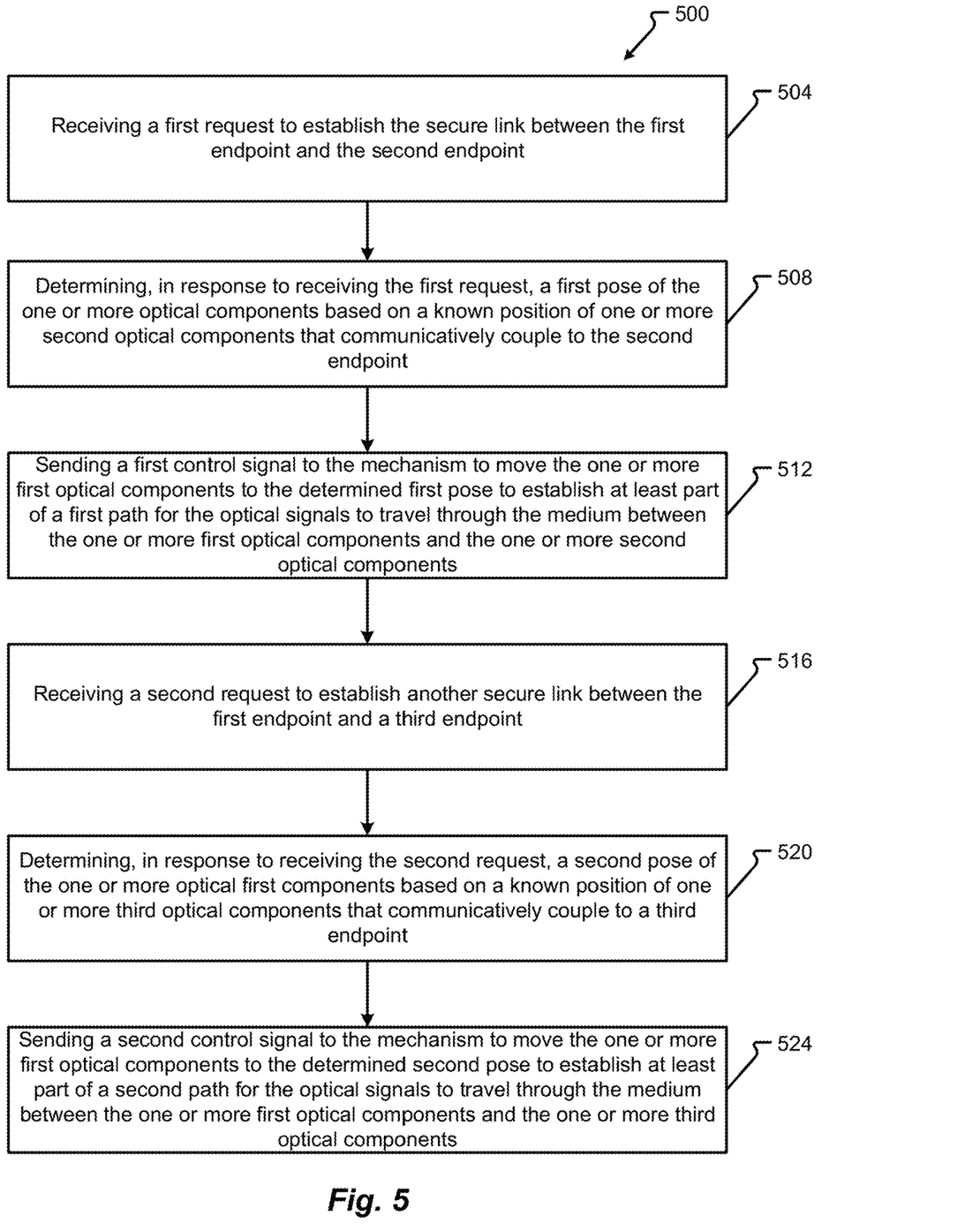
FIG. 5 illustrates a method according to at least one example embodiment.

FIG. 5 illustrates a method 500 according to at least one example embodiment.

The method 500 (and/or one or more stages thereof) may be carried out or otherwise performed by various elements of the systems 100 and/or 200, for example, by processing circuitry 128 and/or processing circuitry 220. For the sake of explanation, FIG. 5 will be described with reference to FIG. 2B. The method 500 may relate to operations carried out for the purpose of establishing a first secure link between two endpoints 104a and 104b and another secure link between one of the endpoints (e.g., 104a) and another, third endpoint 104.

Operation 504 includes receiving a first request to establish the secure link between the first endpoint 104a and the second endpoint 104b. The request may be generated and received in the same manner as that described above for operations 304 and 404.

Operation 508 includes determining, in response to the first request, a first pose of the one or more first optical components 208a based on a known position of one or more second optical components 208b that communicatively couple to the second endpoint 104b. The first pose may be determined in the same or similar manner as that described above in operations 308 and 408.

Operation 512 includes generating and sending a first control signal to the mechanism 224a to move the one or more first optical components 208a to the determined first pose to establish at least part of a first path for the optical signals to travel through the free space medium between one or more first optical components 208a and the one or more second optical components 208b. Operation 512 may be performed in the same or similar manner as that described above with reference to operations 312 and 412. The at least part of the first path for the optical signals may correspond to the part of the path through the free space medium between optical components 208a and optical components 212.

Here, it should be appreciated that in between operations 512 and 516, the first end point 104a and the second endpoint 104b may form a secure link between one another according to the operations described above with reference to FIG. 3 (e.g., by exchanging keys and key IDs according to QKD standards). Thereafter, the first endpoint 104a and the second endpoint 104b may exchange encrypted data over the secure link through communication channel 112.

Operation 516 includes receiving a second request to establish another secure link between the first endpoint 104a and a third endpoint (e.g., another networking device 104). The second request may be generated and received in the same or similar manner as that described above for operations 304, 404, and 504. For example, the first endpoint and/or the third endpoint may generate and/or receive the second request as a result of an application associated with one endpoint wishing to exchange encrypted data with the other endpoint.

Operation 520 includes determining, in response to receiving the second request, a second pose of the one or more first optical components 208a based on a known position of one or more third optical components 208 that communicatively couple to the third endpoint 104. For example, in the same or similar manner as that described above, the processing circuitry 220 may access a mapping of the optical components in the system to determine how the first optical components 208a should be posed in order to establish a free space communication channel between the first optical components 208a and the third optical components 208.

Operation 524 includes generating and sending a second control signal to the mechanism 224a to move the one or more first optical components 208a to the determined second pose to establish at least part of a second path for the optical signals to travel through the free space medium between the one or more first optical components 208a and the one or more third optical components 208. The at least part of the second path for the optical signals may correspond to the part of the path through the free space medium between optical components 208a and optical components 212.

Here, it should be appreciated that subsequent to operation 524, the first end point 104a and the third endpoint 104 may form a secure link between one another according to the operations described above with reference to FIG. 3 (e.g., by exchanging keys and key IDs according to QKD standards). Thereafter, the first endpoint 104a and the third endpoint 104 may exchange encrypted data over the secure link through communication channel 112.

FIG. 5 has been described with reference to an example where the first optical components 208a are moved to establish a proper free space communication channel, however, it should be appreciated that the second optical components 208b, the third optical components 208, and/or the optical components 212 may also be moved in the same or similar manner to establish the proper free space communication channel.

Here, it should be appreciated that various operations in FIGS. 3 to 5 may be carried out in a different order and/or substantially simultaneously. For example, operations 404 and 416 may be performed substantially simultaneously, operations 408 and 420 may be performed substantially simultaneously, and operations 412 and 424 may be performed substantially simultaneously. It should further be appreciated that various operations described with reference to FIGS. 3-5 may be repeated for multiple other endpoints within the data center in order to establish an all-to-all connectivity capability between racks 204.

In view of FIGS. 1 to 5, at least one example embodiments provides an apparatus comprising a support structure 204, for example, a server or switch rack. The apparatus further comprises one or more first optical components 208a on the support structure 204 that communicatively couple with a first endpoint 104a. The one or more first optical components 208a are configured to output and receive optical signals that travel over a free space medium to establish a secure link between the first endpoint 104a and a second endpoint 104b. As may be appreciated, the one or more first optical components 208a are positioned at a first location on the support structure 204 such that the optical signals output from and received by the one or more first optical components 208a travel toward or away from a second location in the free space medium that is above the first location (e.g., toward optical components 212). The one or more first optical components 208a comprises at least one lens and at least one component that redirects the optical signals, for example, at least one mirror or prism.

The apparatus further comprises a mechanism 224a that moves the one or more first optical components 208a. In addition, the apparatus may further comprise the first endpoint 104a mounted on or in the support structure 204, and at least one waveguide 216 mounted on or otherwise fixed to the support structure 204 and optically coupled to the first endpoint 104a and the one or more first optical components 208a. For example, the at least one waveguide 216 is coupled to a QKD device 116 of the first endpoint 104a and carries signals used to establish a secure link between the first endpoint 104a and the second endpoint 104b. The secure link may be established with the optical signals according to Quantum Key Distribution (QKD) protocol. To this end, the first endpoint 104a may comprise an optical transceiver (e.g., the QKD device 116) that generates the optical signals according to the QKD protocol to exchange one or more keys and one or more key identifiers with the second endpoint 104b. Upon formation of the secure link over a free space channel in accordance with devices and methods described above, the secure link (e.g., communication channel 112) passes data encrypted with the one or more keys between the first endpoint 104a and the second endpoint 104b.

In view of FIGS. 1-5, at least one example embodiment is directed to a system comprising a first support structure 204 and one or more first optical components 208a on the first support structure 204 that communicatively couple with a first endpoint 104a. The one or more first optical components 208a are configured to output and receive optical signals 210 that travel over a free space medium to establish a secure link between the first endpoint 104a and a second endpoint 104b. The system may include a second support structure 204 and one or more second optical components 208b on the second support structure 204 that communicatively couple with the second endpoint 104b. The one or more second optical components 208b are configured to output and receive the optical signals 210 that travel over the free space medium to establish the secure link between the first endpoint 104a and the second endpoint 104b.

The system may further include one or more third optical components 212 positioned above the first structure 204 and the second structure 204 and configured to direct the optical signals 210 toward and away from the one or more first optical components 208a and the one or more second optical components 208b. The system may further include a first mechanism 224a that moves the one or more first optical components 208a, and a second mechanism 224b that moves the one or more second optical components 208b. In accordance with at least one example embodiment, the first endpoint 104a and the second endpoint 104b comprise optical transceivers (e.g., within QKD devices 116) that generate the optical signals 210 to exchange one or more keys and one or more key identifiers over the free space medium according to a QKD protocol, thereby establishing the secure link.

In view of the foregoing description and following claims, it should be appreciated that inventive concepts provide a scalable and cost effective approach for forming secure links (e.g., quantum secure links) between endpoints, for example, within a datacenter. For example, inventive concepts employ free space communication channels in order to establish secure links between endpoints, thereby reducing the cabling otherwise required for establishing a communication channel between the endpoints. In addition, this approach enables after-market installation of QKD capability for endpoints within a data center. Example embodiments have been shown and described with reference to establishing secure links between endpoints over a free space medium according to QKD standards, but other suitable encryption standards may be used in addition or in the alternative.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) An apparatus, comprising:
  a support structure; and
  one or more first optical components on the support structure that communicatively couple with a first endpoint, the one or more first optical components being configured to output and receive optical signals that travel over a free space medium to establish a secure link between the first endpoint and a second endpoint.

(2) The apparatus of (1), wherein the one or more first optical components are positioned at a first location on the support structure such that the optical signals output from and received by the one or more optical first components travel toward or away from a second location in the free space medium that is above the first location.

(3) The apparatus of one or more of (1) to (2), wherein the one or more first optical components comprises at least one lens and at least one component that redirects the optical signals.

(4) The apparatus of one or more of (1) to (3), further comprising:
  a mechanism that moves the one or more first optical components.

(5) The apparatus of one or more of (1) to (4), further comprising:
  processing circuitry that:
    receives a first request to establish the secure link between the first endpoint and the second endpoint;
    determines, in response to the first request, a first pose of the one or more first optical components based on a known position of one or more second optical components that communicatively couple to the second endpoint; and
    sends a first control signal to the mechanism to move the one or more first optical components to the determined first pose to establish at least part of a first path for the optical signals to travel through the free space medium between one or more first optical components and the one or more second optical components.

(6) The apparatus of one or more of (1) to (5), wherein the processing circuitry:
  receives a second request to establish another secure link between the first endpoint and a third endpoint;
  determines, in response to the second request, a second pose of the one or more first optical components based on a known position of one or more third optical components that communicatively couple to the third endpoint; and
  sends a second control signal to the mechanism to move the one or more first optical components to the determined second pose to establish at least part of a second path for the optical signals to travel through the free space medium between the one or more first optical components and the one or more third optical components.

(7) The apparatus of one or more of (1) to (6), further comprising:
  the first endpoint mounted on the support structure; and
  at least one waveguide on the support structure and optically coupled to the first endpoint and the one or more first optical components.

(8) The apparatus of one or more of (1) to (7), wherein the secure link is established with the optical signals according to Quantum Key Distribution (QKD) protocol.

(9) The apparatus of one or more of (1) to (8), wherein the first endpoint comprises an optical transceiver that generates the optical signals according to the QKD protocol to exchange one or more keys and one or more key identifiers with the second endpoint.

(10) The apparatus of one or more of (1) to (9), wherein the secure link passes data encrypted with the one or more keys between the first endpoint and the second endpoint.

(11) A system, comprising:
  a first support structure;
  one or more first optical components on the first support structure that communicatively couple with a first endpoint, the one or more first optical components being configured to output and receive optical signals that travel over a free space medium to establish a secure link between the first endpoint and a second endpoint;
  a second support structure; and
  one or more second optical components on the second support structure that communicatively couple with the second endpoint, the one or more second optical components being configured to output and receive the optical signals that travel over the free space medium to establish the secure link between the first endpoint and the second endpoint.

(12) The system of (11), further comprising:
  one or more third optical components positioned above the first structure and the second structure and configured to direct the optical signals toward and away from the one or more first optical components and the one or more second optical components.

(13) The system of one or more of (11) to (12), further comprising:
  a first mechanism that moves the one or more first optical components; and
  a second mechanism that moves the one or more second optical components.

(14) The system of one or more of (11) to (13), further comprising:
  first processing circuitry that:
    receives a first instance of a request to establish the secure link between the first endpoint and the second endpoint;
    determines, in response to the first instance of the request, a first pose of the one or more first optical components based on a known position of the one or more second optical components; and
    sends a first control signal to the first mechanism to move the one or more first optical components to the determined first pose to establish a first part of a path for the optical signals through the free space medium between the one or more first optical components and the one or more second optical components.

(15) The system of one or more of (11) to (14), further comprising:
second processing circuitry that:
receives a second instance of the request to establish the secure link between the first endpoint and the second endpoint;
determines, in response to the second instance of the request, a second pose of the one or more second optical components based on a known position of the one or more first optical components; and
sends a second control signal to the second mechanism to move the one or more second optical components to the determined second pose to establish a second part of the path for the optical signals through the free space medium between the one or more first optical components and the one or more second optical components.

(16) The system of one or more of (11) to (15), further comprising:
one or more third optical components positioned above the first structure and the second structure, the one or more third optical components being configured to direct the optical signals traveling along the first part of the path to the second part of the path.

(17) The system of one or more of (11) to (16), wherein the first endpoint and the second endpoint comprise optical transceivers that generate the optical signals to exchange one or more keys and one or more key identifiers over the free space medium according to a QKD protocol, thereby establishing the secure link.

(18) A method, comprising:
receiving a request to establish a secure link between a first endpoint and a second endpoint;
determining, in response to the request, a pose of one or more first optical components associated with the first endpoint based on a known position of one or more second optical components associated with the second endpoint; and
generating a control signal that causes movement of the one or more first optical components to the determined pose to establish at least part of a path for optical signals to travel over a free space medium to the one or more second optical components associated with the second endpoint.

(19) The method of (18), further comprising:
forming the secure link between the first endpoint and the second endpoint using the optical signals.

(20) The method of one or more of (18) to (19), wherein the secure link is quantum secure.

What is claimed is:

1. An apparatus, comprising:
a support structure;
one or more first optical components on the support structure that communicatively couple with a plurality of first endpoints, the one or more first optical components being configured to output and receive optical signals that travel over a free space medium to establish separate secure links between the plurality of first endpoints and one or more second endpoints;
a mechanism configured to move the one or more first optical components; and
processing circuitry configured to:
receive a first request to establish a secure link between an endpoint of the plurality of first endpoints and an endpoint of the one or more second endpoints;
determine, in response to the first request, a first pose of the one or more first optical components based on a known position of one or more second optical components that communicatively couple to the endpoint of the one or more second endpoints; and
send a first control signal to the mechanism to move the one or more first optical components to the determined first pose to establish at least part of a first path for the optical signals to travel through the free space medium between the one or more first optical components and the one or more second optical components.

2. The apparatus of claim 1, wherein the one or more first optical components are positioned at a first location on the support structure such that the optical signals output from and received by the one or more optical first components travel toward or away from a second location in the free space medium that is above the first location.

3. The apparatus of claim 1, wherein the one or more first optical components comprises at least one lens and at least one component configured to redirect the optical signals.

4. The apparatus of claim 1, wherein the processing circuitry is configured to:
control, in response to a trigger, the mechanism to move the one or more first optical components from the first pose to a second pose that enables the optical signals to travel to another one of the one or more second endpoints over the free space medium.

5. The apparatus of claim 1, wherein the processing circuitry is configured to:
receive a second request to establish another secure link between the endpoint of the plurality of first endpoints and a third endpoint;
determine, in response to the second request, a second pose of the one or more first optical components based on a known position of one or more third optical components that communicatively couple to the third endpoint; and
send a second control signal to the mechanism to move the one or more first optical components to the determined second pose to establish at least part of a second path for the optical signals to travel through the free space medium between the one or more first optical components and the one or more third optical components.

6. The apparatus of claim 1, further comprising:
the plurality of first endpoints mounted on the support structure; and
at least one waveguide on the support structure and optically coupled to the plurality of first endpoints and the one or more first optical components.

7. The apparatus of claim 1, wherein the separate secure links comprise a different secure link between each first endpoint and the one or more second endpoints, and wherein the separate secure links are established according to Quantum Key Distribution (QKD) protocol.

8. The apparatus of claim 7, further comprising:
an optical transceiver configured to generate the optical signals according to the QKD protocol to exchange one or more keys and one or more key identifiers with the one or more second endpoints.

9. The apparatus of claim 8, wherein the separate secure links pass data encrypted with the one or more keys.

10. A system, comprising:
a first support structure;
one or more first optical components on the first support structure that communicatively couple with a plurality of first endpoints, the one or more first optical components being configured to output and receive optical signals that travel over a free space medium to establish separate secure links between the plurality of first endpoints and a second endpoint;

a second support structure;

one or more second optical components on the second support structure that communicatively couple with the second endpoint, the one or more second optical components being configured to output and receive the optical signals that travel over the free space medium to establish the separate secure links between the plurality of first endpoints and the second endpoint;

a first mechanism configured to move the one or more first optical components; and first processing circuitry configured to:
 receive a first instance of a request to establish a secure link between an endpoint of the plurality of first endpoints and the second endpoint;
 determine, in response to the first instance of the request, a first pose of the one or more first optical components based on a known position of the one or more second optical components; and
 send a first control signal to the first mechanism to move the one or more first optical components to the determined first pose to establish a first part of a path for the optical signals through the free space medium between the one or more first optical components and the one or more second optical components.

11. The system of claim 10, further comprising:
one or more third optical components positioned above the first support structure and the second support structure and configured to direct the optical signals toward and away from the one or more first optical components and the one or more second optical components.

12. The system of claim 10, further comprising:
a second mechanism configured to move the one or more second optical components.

13. The system of claim 12, further comprising:
second processing circuitry configured to:
 receive a second instance of the request to establish the secure link between the endpoint of the plurality of first endpoints and the second endpoint;
 determine, in response to the second instance of the request, a second pose of the one or more second optical components based on a known position of the one or more first optical components; and
 send a second control signal to the second mechanism to move the one or more second optical components to the determined second pose to establish a second part of the path for the optical signals through the free space medium between the one or more first optical components and the one or more second optical components.

14. The system of claim 13, further comprising:
one or more third optical components positioned above the first support structure and the second support structure, the one or more third optical components being configured to direct the optical signals traveling along the first part of the path to the second part of the path.

15. The system of claim 10, further comprising:
optical transceivers configured to generate the optical signals to exchange one or more keys and one or more key identifiers over the free space medium according to a QKD protocol, thereby establishing the separate secure links.

16. A method, comprising:
receiving a plurality of requests to establish separate secure links between a plurality of first endpoints and at least one second endpoint;

determining, in response to the request, a pose of one or more first optical components associated with the plurality of first endpoints based on a known position of one or more second optical components associated with the at least one second endpoint;

generating a control signal that causes movement of the one or more first optical components to the determined pose to establish at least part of a path for optical signals to travel over a free space medium to the one or more second optical components associated with the at least one second endpoint; and forming the separate secure links between the plurality of first endpoints and the at least one second endpoint using the optical signals as guided by the one or more first optical components and the one or more second optical components.

17. The method of claim 16, wherein forming the separate secure links forms a different secure link between each first endpoint and the at least one second endpoint.

18. The method of claim 16, wherein the separate secure links are quantum secure.

* * * * *